US008876951B2

(12) United States Patent
Mak

(10) Patent No.: US 8,876,951 B2
(45) Date of Patent: Nov. 4, 2014

(54) GAS PURIFICATION CONFIGURATIONS AND METHODS

(75) Inventor: John Mak, Santa Ana, CA (US)

(73) Assignee: Fluor Technologies Corporation, Aliso Viejo, CA (US)

(*) Notice: Subject to any disclaimer, the term of this patent is extended or adjusted under 35 U.S.C. 154(b) by 337 days.

(21) Appl. No.: 13/498,084

(22) PCT Filed: Sep. 29, 2010

(86) PCT No.: PCT/US2010/050649
§ 371 (c)(1),
(2), (4) Date: Oct. 22, 2012

(87) PCT Pub. No.: WO2011/041361
PCT Pub. Date: Apr. 7, 2011

(65) Prior Publication Data
US 2013/0032029 A1 Feb. 7, 2013

Related U.S. Application Data

(60) Provisional application No. 61/246,896, filed on Sep. 29, 2009.

(51) Int. Cl.
B01D 53/02 (2006.01)
C10L 3/10 (2006.01)
B01D 53/14 (2006.01)
B01D 53/04 (2006.01)

(52) U.S. Cl.
CPC ....... *B01D 53/0462* (2013.01); C10L 2290/544 (2013.01); *C10L 3/103* (2013.01); B01D 2259/40086 (2013.01); *C10L 3/104* (2013.01); B01D 2252/20468 (2013.01); *B01D 53/1462* (2013.01); B01D 2256/22 (2013.01); Y02C 10/08 (2013.01); B01D 2257/304 (2013.01); Y02C 10/06 (2013.01); B01D 2257/702 (2013.01); B01D 2252/20447 (2013.01); B01D 2253/108 (2013.01); *B01D 2252/2026* (2013.01); *B01D 2257/504* (2013.01); *B01D 53/1475* (2013.01)
USPC ........... 95/92; 95/94; 95/136; 96/234; 62/618

(58) Field of Classification Search
CPC ............ B01D 2252/2026; B01D 2252/20447; B01D 2252/20468; B01D 2253/108; B01D 2256/22; B01D 2257/304; B01D 2257/504; B01D 2257/702; B01D 2259/40086; B01D 53/0462; B01D 53/1462; B01D 53/1475; C10L 2290/544; C10L 3/103; C10L 3/104; Y02C 10/06; Y02C 10/08
USPC ..................... 95/92, 94, 136; 96/234; 92/618
See application file for complete search history.

(56) References Cited

U.S. PATENT DOCUMENTS 3,656,887 A * 4/1972 Suzuki et al. ................. 423/226
4,259,301 A 3/1981 Say
(Continued)

FOREIGN PATENT DOCUMENTS

GB 1451645 10/1976
GB 2275625 9/1994

OTHER PUBLICATIONS

"International Search Report and the Written Opinion of the International Searching Authority", Patent Cooperation Treaty, Nov. 18, 2010.

(Continued)

Primary Examiner — Christopher P Jones
(74) Attorney, Agent, or Firm — Fish & Tsang, LLP

(57) ABSTRACT

Acid gas is removed from a feed gas in an absorber that produces a treated feed gas and a rich solvent. The treated feed gas is passed through an H2S scavenger bed, and the H2S scavenger bed is regenerated using H2S depleted acid gas flashed from the rich solvent. Most preferably, the off gas from the regenerating bed is injected into a formation.

14 Claims, 1 Drawing Sheet

(56) References Cited

U.S. PATENT DOCUMENTS

| | | | |
|---|---|---|---|
| 4,273,621 A * | 6/1981 | Fornoff | 203/19 |
| 4,442,078 A | 4/1984 | Jalan et al. | |
| 4,522,793 A * | 6/1985 | Larson et al. | 423/230 |
| 4,971,682 A * | 11/1990 | Clark | 208/305 |
| 5,414,190 A * | 5/1995 | Forg et al. | 585/802 |
| 6,620,983 B1 * | 9/2003 | Cao et al. | 585/640 |
| 7,192,468 B2 | 3/2007 | Mak et al. | |
| 2005/0172807 A1 | 8/2005 | Mak | |
| 2006/0266214 A1 | 11/2006 | Won | |
| 2007/0006732 A1 | 1/2007 | Mitariten | |
| 2008/0019899 A1 | 1/2008 | Mak et al. | |
| 2011/0185896 A1 * | 8/2011 | Sethna et al. | 95/45 |

OTHER PUBLICATIONS

European Patent Office, "EP Search Report", EPO Application No. 10821143.4, PCT Application No. PCT/US10/50649, issued Oct. 7, 2013.

* cited by examiner

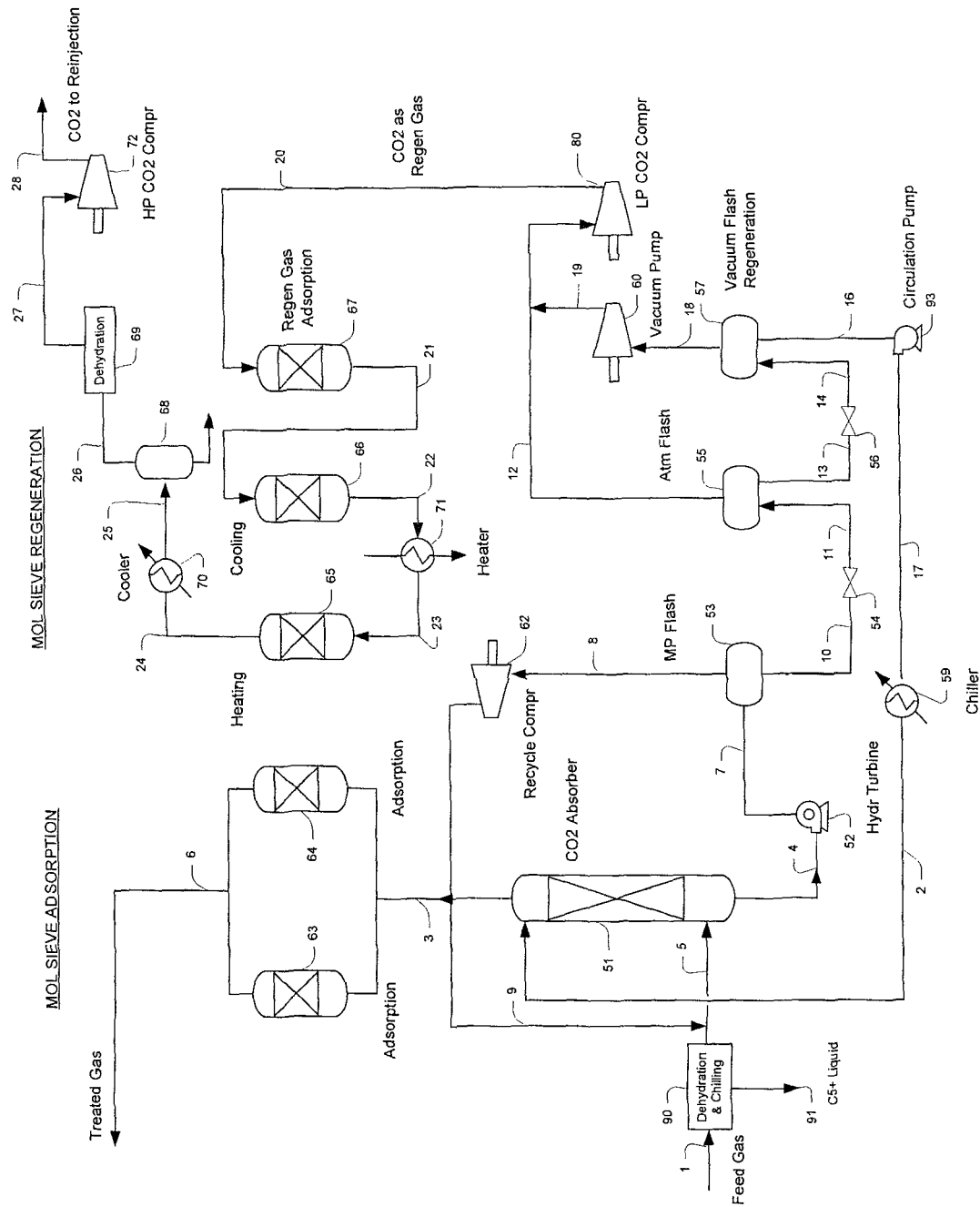

GAS PURIFICATION CONFIGURATIONS AND METHODS

This application claims priority to our U.S. provisional patent application having Ser. No. 61/246,896, filed 29 Sep. 2009.

FIELD OF THE INVENTION

The field of the invention is removal of acid gases from a feed gas, and particularly relates to acid gas removal from high pressure gases with high CO2 and H2S content and the production of a pipeline quality product gas and a concentrated CO2 stream for re-injection.

BACKGROUND OF THE INVENTION

As low sulfur natural gas fields are being depleted, gas production from sour gas fields has become increasingly common to meet today's energy demands. Acid gas removal from these sour gas fields, and especially removal of highly sour gas fields, requires significant capital investments and operating costs. While these plants must demonstrate their economics, they must also comply with today's gas pipeline specifications with increasing stringent requirements on energy efficiency and emissions standards. Compounding these challenges is that the acid gas content of these gas fields often increases over time, which often renders conventional acid gas removal plants ineffective to produce a product that complies with current consumer gas pipeline specifications.

Acid gases can be removed using a conventional amine process, however, such process is typically not economical as the amine solvent circulation must be increased proportionally with the feed gas acid gas content, requiring higher steam heating duty in solvent regeneration, and hence higher greenhouse gas emissions. Moreover, there is also an upper limit in the acid gas loading capacity (i.e., mol of acid gas per mole of amine) which is predominantly controlled by the chemical equilibrium between amine and the acid gases. To overcome at least some of these problems, physical solvents may be employed that operate on the principal of Henry's law in which acid gas loading of the solvent increases with the acid gas content and partial pressure. Thus, and at least conceptually, physical solvent absorption of acid gas is relatively attractive for high acid gas fields. Solvent regeneration can be accomplished, to at least some extent, by flash regeneration that eliminates the need for heating and so reduces greenhouse gas emissions. However, without external heating, physical solvent can only be partially regenerated and is therefore often unsuitable for treatment of sour gases to produce a product that meets pipeline gas specifications (e.g., 1 mol % CO2, 4 ppmv H2S). For example, when conventional physical solvent processes are used for treatment of a feed gas with high H2S content (e.g., ≥100 ppmv), they typically exceed H2S limits for the treated gas. To improve the gas quality, a sulfur scavenger bed can be used to adsorb H2S in the feed gas or product. However, such solution is temporary, and in most cases requires the presence of a sulfur plant. Moreover, disposal and handling of the spent sulfur contaminated beds is often environmentally unacceptable.

Thus, although various configurations and methods are known to remove acid gases from a feed gas, all or almost all of them suffer from one or more disadvantages. Among other things, H2S levels in the treated gases are often high, and the use of physical solvent, without heat application, would not be suitable to produce treated gas that meets gas pipeline specifications. Therefore, there is still a need to provide improved methods and configurations for acid gas removal.

SUMMARY OF THE INVENTION

The present inventive subject matter is drawn to systems, configurations, and methods of acid gas removal from a feed gas in which a physical solvent absorption process is used to produce a treated gas and a CO2-rich stream. H2S is removed from the treated gas with one or more molecular sieves that are then regenerated using the CO2-rich stream to so produce an H2S-enriched CO2 product, which is preferably dehydrated and re-injected.

In especially preferred aspects of the inventive subject matter, a method of treating a CO2 and H2S-containing feed gas includes one step of removing CO2 from a feed gas in an absorber using a flashed lean physical solvent to form a treated gas and a rich solvent. In another step, H2S is removed from the treated gas using a molecular sieve bed to form an H2S loaded molecular sieve bed, and in yet another step, the rich solvent is flashed to produce the flashed lean solvent that is reintroduced into the absorber and to further produce a CO2-rich stream. The H2S loaded molecular sieves are then regenerated using the CO2-rich stream to thereby form an H2S-enriched CO2 product.

Most typically, H2S is removed from the CO2-rich stream prior to the step of regenerating the H2S loaded molecular sieves using an additional molecular sieve bed, and/or water is removed from the H2S-enriched CO2 product. It is further generally preferred that the H2S-enriched CO2 product is compressed and re-injected into a formation or other suitable location for sequestration or enhanced oil recovery. Additionally, it is preferred that the CO2-rich stream is heated for the step of regenerating the H2S loaded molecular sieve bed.

In contemplated methods it is generally preferred that the step of flashing the rich solvent comprises a step of vacuum flashing, and/or that the step of flashing the rich solvent is performed over multiple flashing stages, wherein at least one of the multiple flashing stages produces a hydrocarbon-enriched vapor, which is most preferably compressed and combined with the feed gas. While not limiting to the inventive subject matter, it is generally preferred that substantially all (i.e., at least 80%, more typically at least 90%, and most typically at least 95%) of the CO2-rich stream is formed from the rich solvent without heating the rich solvent. Similarly, it is preferred that the feed gas is dehydrated and chilled to condense and remove C5+ hydrocarbons from the feed gas.

Viewed from a different perspective, a method of regenerating an H2S loaded molecular sieve bed is therefore contemplated in which in one step a molecular sieve bed is contacted with a treated feed gas from which CO2 has been removed to so form the H2S loaded molecular sieve bed. In another step, the H2S loaded molecular sieve bed is contacted with the CO2 to thereby regenerate the molecular sieve bed and form an H2S-enriched CO2 product. In such methods, it is typically preferred that the H2S has been removed from the CO2 using an additional molecular sieve bed prior to the step of contacting the H2S loaded molecular sieve bed with the CO2, and/or that water is condensed and removed from the H2S-enriched CO2 product. Where desired, the H2S-enriched CO2 product is re-injected into a formation or other suitable location.

In view of the foregoing, the inventor also contemplate an acid gas treatment plant that includes an absorber in which a lean flashed physical solvent adsorbs CO2 and H2S from a feed gas to produce a treated gas and a rich solvent. A first vessel comprising a molecular sieve bed is coupled to the absorber to allows adsorption of H2S and water from the treated gas, while a flash vessel is coupled to the absorber and is configured to receive the rich solvent and to produce a CO2-rich stream and the flashed lean solvent. A second vessel comprising an H2S loaded molecular sieve bed is fluidly coupled to the flash vessel to receive the CO2-rich stream, thereby producing an H2S-enriched CO2 product and a regenerated molecular sieve bed.

Contemplated plants will preferably further include a heater fluidly coupled between the flash vessel and the second vessel and to heat the CO2-rich stream, and/or a medium pressure flash vessel fluidly coupled between the absorber and the flash vessel to produce a hydrocarbon recycle stream. It is still further preferred that a recycle conduit is provided to allow combining the hydrocarbon recycle stream with the feed gas. Most typically, contemplated plants will also include a third vessel with an additional molecular sieve bed and to remove H2S from the CO2-rich stream. Where desired or otherwise needed, a chiller is fluidly coupled upstream of the absorber to chill the feed gas to a temperature for condensation and removal of water and C5+ hydrocarbons from the feed gas.

Various objects, features, aspects and advantages of the present invention will become more apparent from the following detailed description of preferred embodiments of the invention.

BRIEF DESCRIPTION OF THE DRAWING

FIG. 1 is an exemplary schematic for acid gas removal using a physical solvent for a plant according to the inventive subject matter.

DETAILED DESCRIPTION

The present invention is directed to configurations and methods of removing CO2 and H2S from a feed gas using a two stage removal process in which an acid gas is removed in a first step using a conventional physical solvent absorption process, and in which residual acid gas, and particularly H2S and water are removed from the treated gas in a second step using one or more molecular sieve beds.

Most preferably, the H2S loaded molecular sieve bed is regenerated using a CO2-rich stream that is produced from the first removal step. Thus, it should be appreciated that two different contaminants can be removed from a feed gas where one contaminant is adsorbed in the molecular sieve bed and where the other contaminant is used to regenerate the molecular sieve bed, thereby forming an offgas with both contaminants and a treated gas with desirable characteristics (e.g., treated gas conforms to pipeline specifications).

In one particularly preferred aspect of the inventive subject matter, a physical solvent unit is used to remove of the bulk of the acid gases from a feed gas, and the so formed rich physical solvent is preferably regenerated in multi-stage flash regeneration separators, while recovering and recycling hydrocarbons content. Preferably, hydrocarbon losses are reduced by the recycling loop to less than 5%, more preferably less than 4%, and most preferably less than 2%, while allowing for production of an acid gas from the last flash stage(s) that is used for regeneration of the molecular sieve bed. The acid gas from the last flash stage(s) is most preferably subjected to an H2S removal step, typically using an additional molecular sieve bed.

In especially preferred aspects, the molecular sieve adsorption stage includes at least two adsorption beds, preferably four, or even more adsorption beds that adsorb the residual H2S content of the treated gas from the physical solvent absorption step, producing a treated gas with an H2S and/or water content of less than 4 ppmv, and more preferably less than 2 ppmv. As noted above, at least a portion of the CO2-rich stream from the flash regeneration stage(s) is passed through one or more molecular sieve beds to produce an H2S depleted CO2 stream that is then used for regenerating H2S loaded molecular sieve bed, typically using a cooling and heating cycle (e.g., at 400 to 600° F. and 400 to 600 psig).

One exemplary plant configuration according to the inventive subject matter is shown in FIG. 1. Feed gas stream 1, typically with 12 mol % CO2 and about 100 ppmv H2S, at about 100° F. and about 1200 psig is dried and chilled in unit 90, producing a C5+ liquid stream 91. The term "about" where used herein in conjunction with a numeral refers to a +/−10% range (inclusive) of that numeral. The drying step is typically necessary to avoid hydrate formation in the CO2 absorber 51. Additionally, the drying and chilling step also allows for recovery of a C5+ hydrocarbons product. The dried gas is then mixed with the recycle gas stream 9 forming stream 5 and is counter-currently scrubbed by flashed lean solvent stream 2 at about −15° F. producing a treated gas stream 3 at about −10° F. and a rich solvent stream 4 at about −1° F. Most typically, the absorber contains contacting devices, including packings or trays, or other suitable media for acid gas absorption. The treated gas stream 3 contains about 2 mol % CO2 and about 6 to 10 ppmv H2S (or even higher) and is fed to molecular sieve beds 63 and 64 to further reduce its H2S content to below 4 ppmv (preferably below 1 ppmv) and water content to below 2 ppmv to meet sales gas pipeline specifications as product stream 6.

The rich solvent stream is letdown in pressure via hydraulic turbine 52 to about 350 to 750 psig forming stream 7, at −8° F. The letdown stream is separated in separator 53, producing a flashed vapor stream 8 and a flashed liquid stream 10. The flash vapor stream 8 is compressed by recycle gas compressor 62 to about 1200 psig forming stream 9 prior to mixing with the feed gas. The flashed liquid is letdown in pressure via JT valve 54 to atmospheric pressure, forming stream 11. It should be noted that the multi-stage flash drums can be used to reduce energy consumption by the recycle compressor. The letdown stream 11 is then separated in separator 55, producing a flashed vapor stream 12 and a flashed liquid stream 13. The flashed solvent stream 13 is finally letdown in pressure in JT valve 56 to about 2 to 5 psia forming stream 14 at about −10° F. The letdown stream 14 is separated in separator 57, producing a vacuum flashed vapor stream 18 and a vacuum flashed liquid stream 16, which is pumped by solvent circulation pump 93 as stream 17 to the solvent chiller 59 to so form chilled solvent 2. The vacuum pressure is maintained by the vacuum pump or compressor 60. Stream 18 is compressed by the vacuum pump 60 forming stream 19 that is combined with stream 12 from the atmospheric flash drum 55. The combined stream is further compressed by the LP CO2 compressor 80 forming stream 20 at about 200 psig to 600 psig; the optimum pressure depending on the molecular sieves chemical characteristics.

CO2-rich stream 20 is then treated in an additional molecular sieve bed 67 for H2S adsorption producing an H2S depleted CO2-rich stream 21, which is used for cooling the molecular sieve bed 66 producing heated CO2-rich stream 22 that is further heated in heater 71 to about 500 to 600° F. to so form stream 23, that is then used for the regeneration of H2S loaded molecular sieve bed 65. The H2S-enriched CO2 product stream 24 is cooled in cooler 70 to about 90° F. forming stream 25. Water condensate of stream 25 is separated and removed in separator 68, while the vapor 26 is dried in dehydration unit 69 producing a dried gas 27 that is further compressed by HP CO2 compressor 72 to about 4000 psig forming stream 28 that is used for CO2 re-injection.

Thus, it should be appreciated that methods of treating a CO2 and H2S-containing feed gas are contemplated in which CO2 is removed from the feed gas in an absorber using a flashed lean physical solvent to so form a treated gas and a rich solvent. H2S is then removed from the treated gas using a molecular sieve bed to thereby form an H2S loaded molecular sieve bed that is regenerated using at least a portion of the CO2-rich stream to thereby form an H2S-enriched CO2 product, wherein the CO2-rich stream is produced by flashing the rich solvent.

Of course, it should be recognized that numerous variations of the exemplary plant of FIG. 1 can be implemented without departing from the inventive concept presented herein. For example, while all molecular sieve beds in FIG. 1 are depicted as fixed installations, it should be noted that configurations and methods are contemplated where input and output of the molecular sieve beds can be switched in a fully automated manner using control units, valves, and conduits as suitable. Thus, H2S can be removed from the treated gas stream in a continuous manner such that one bed is fluidly coupled to the absorber to receive the treated gas while the other bed is fluidly coupled to the outlet of the additional molecular sieve bed. Consequently, especially preferred configurations are those in which at least one of the molecular sieve beds in the adsorption section (e.g., replacing, in parallel, or in series to 63 or 64) can be fluidly coupled to at least one position (e.g., replacing, in parallel, or in series to 65, 66, or 67) in the regeneration section. Therefore, redundant molecular sieve beds are preferably arranged and coupled to allow continuous flow of treated gas and/or H2S-enriched CO2 product (not shown) while changing a H2S loaded molecular sieve bed to a regenerated molecular sieve bed. Alternatively, flow can be manually switched between various vessels. In still further contemplated configurations, one or more vessels can be physically exchanged to replace regenerated and/or saturated vessels.

With respect to suitable feed gases it should be appreciated that the pressure of such gases may vary considerably, and that the nature of the gas will at least in part determine the pressure. It is particularly preferred, however, that the feed gas has a pressure of at least 400 psig, more typically at least 1000 psig, and most typically at least 1200 psig. Similarly, numerous feed gas compositions are deemed suitable for use in conjunction with the teachings presented herein. However, it is especially preferred that the feed gas comprises at least 10 mol %, and most preferably 30 mol % and higher CO2, and at least 100 ppmv and most preferably at least 1000 ppmv H2S, while the treated gas from the physical solvent unit typically contains 2% CO2 and 10 ppmv or higher H2S. After passing the treated gas through the H2S scavenger bed(s), it is preferred that the H2S concentration is equal or less than 5 ppmv, more preferably equal or less than 3 ppmv, and most preferably equal or less than 1 ppmv.

It should also be recognized that the nature of the solvent may vary considerably, and that all physical solvents and mixtures thereof are deemed appropriate for use herein. There are numerous physical solvents known in the art, and exemplary preferred physical solvents include FLUOR SOLVENT® (propylene carbonate), NMP (normal-methyl pyrrolidone), SELEXOL® (dimethyl ether of polyethylene glycol), and TBP (tributyl phosphate), and/or various polyethylene glycol dialkyl ethers. Alternatively, other solvents including enhanced tertiary amine (e.g., piperazine) or other solvent or a mixture of solvents may be employed having similar behavior as physical solvent.

Flashing of the rich solvent may be performed using numerous devices, and it is generally contemplated that all pressure reduction devices are suitable for use herein. However, with respect to the amount of pressure reduction it is typically preferred that the rich solvent (after providing work and/or cooling) is first let down in pressure to a pressure sufficient to release flashed vapors with methane content of about 20 to 70%. These vapors are most preferably recycled to the absorber minimizing methane losses to less than 5% and most preferably less than 1%. After such pressure reduction, the pressure of the solvent is then preferably reduced to atmospheric pressure or sub-atmospheric pressure, most typically in at least two stages. The CO2 stream so produced from the (vacuum) flash stages typically contains C4+ hydrocarbons at less than 5 mol %, and more typically of less than 2.5 mol %, which renders such H2S-enriched CO2 product suitable for EOR. Where desirable, water is removed from the H2S-enriched CO2 product using condensation and/or known dehydration units.

It should be noted that in contemplated configurations and methods the hydraulic turbine operates an energy efficient device as it generates refrigeration cooling by expansion and flashing of the acid gas content while providing shaft work to provide work (e.g., drive the solvent circulation pump or generate electric power). It should also be recognized that the multi-stage separators can be used to further improve efficiency and may be configured as stacked separators to minimize the plot space footprint and equipment cost, resulting in an even more efficient design.

Consequently, it is contemplated that the configurations according to the inventive subject matter will significantly reduce overall energy consumption and capital cost for high acid gas removal as compared to conventional acid gas removal processes including amine or other physical solvents, or membranes. Moreover, contemplated configurations and processes will typically not require an external heat source, and heat, if required, will be supplied by the feed gas or heat of compression either from refrigeration and/or feed gas compression system to so further reduce energy consumption and adverse impact on the environment. Still further, enhanced oil recovery projects will frequently encounter an increase in acid gas concentration in the feed gas, typically from 10% up to as high as 60%. Contemplated configurations and processes can accommodate these changes with essentially the same solvent circulation.

Another advantage of contemplated methods and configurations is their simplicity requiring less supporting offsite and utility systems, such as handling of spent solid waste of conventional sulfur scavenger beds, thereby greatly reducing environment impacts. Further aspects, methods, and configurations suitable for use herein are described in our commonly owned U.S. Pat. No. 7,192,468, co-pending U.S. patent application published as U.S. Pat. App. No. 2005/0172807, and our International patent application with the serial number PCT/US10/49058, all of which are incorporated by reference herein.

Thus, specific compositions and methods of acid gas removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of treating a feed gas that includes $CO_2$ and $H_2S$, comprising:
    removing in an absorber $CO_2$ from a feed gas using a flashed lean physical solvent to so form a treated gas and a rich solvent;
    removing $H_2S$ from the treated gas using a molecular sieve bed to thereby form an $H_2S$ loaded molecular sieve bed;
    flashing the rich solvent to produce the flashed lean solvent and a $CO_2$-rich stream; and
    regenerating the $H_2S$ loaded molecular sieve bed using the $CO_2$-rich stream to thereby form an $H_2S$-enriched $CO_2$ product.

2. The method of claim 1 wherein $H_2S$ is removed from the $CO_2$-rich stream prior to the step of regenerating the $H_2S$ loaded molecular sieve bed using an additional molecular sieve bed.

3. The method of claim 1 further comprising a step of removing water from the $H_2S$-enriched $CO_2$ product.

4. The method of claim 3 further comprising a step of compressing and re-injecting the $H_2S$-enriched $CO_2$ product.

5. The method of claim 1 further comprising a step of heating the $CO_2$-rich stream for the step of regenerating the $H_2S$ loaded molecular sieve bed.

6. The method of claim 1 wherein the step of flashing the rich solvent comprises a step of vacuum flashing.

7. The method of claim 1 wherein the step of flashing the rich solvent is performed over multiple flashing stages, and wherein at least one of the multiple flashing stages produces a hydrocarbon-enriched vapor.

8. The method of claim 7 further comprising a step of compressing the hydrocarbon-enriched vapor and combining the compressed hydrocarbon-enriched vapor with the feed gas.

9. The method of claim 1 wherein substantially all of the $CO_2$-rich stream is formed from the rich solvent without heating the rich solvent.

10. The method of claim 1 wherein the feed gas is dehydrated and chilled to condense and remove C5+ hydrocarbons from the feed gas.

11. A method of regenerating an $H_2S$ loaded molecular sieve bed, comprising:
    contacting a molecular sieve bed with a treated feed gas from which $CO_2$ has been removed to so form the $H_2S$ loaded molecular sieve bed; and
    contacting the $H_2S$ loaded molecular sieve bed with the $CO_2$ to thereby regenerate the molecular sieve bed and to thereby form an $H_2S$-enriched $CO_2$ product.

12. The method of claim 11 wherein $H_2S$ has been removed from the $CO_2$ using an additional molecular sieve bed prior to the step of contacting the $H_2S$ loaded molecular sieve bed with the $CO_2$.

13. The method of claim 11 further comprising a step of condensing and removing water from the $H_2S$-enriched $CO_2$ product.

14. The method of claim 11 further comprising a step of re-injecting the $H_2S$-enriched $CO_2$ product.

* * * * *